United States Patent

Yokoyama et al.

[11] Patent Number: 5,865,702
[45] Date of Patent: Feb. 2, 1999

[54] OIL TEMPERATURE RESPONSIVE HYDRAULIC CONTROL SYSTEM FOR AN AUTOMATIC TRANSMISSION

[76] Inventors: Fumitomo Yokoyama, 35-70, Ukigaikitsunebora, Miyoshi-cho, Nishikamo-gun, Aichi-ken, 470-02; Kazuhisa Ozaki, 25-5, Aza Arata, Oaza Hishiike, Kota-cho, Nukata-gun, Aichi-ken 444-01; Masahiko Ando, 11-1, Aza Morishita, Nishiotomo-cho, Okazaki-shi, Aichi-ken, 444-12; Akira Fukatsu, 185-1, Nishine, Nezaki-cho, Anjo-shi, Aichi-ken, 444-12; Makoto Hijikata, 162-2, Sakagami, Komashinmachi, Toyota-shi, Aichi-ken, 473; Toshiyuki Mae, 8-2, Ubakute, Nihongi-cho, Anjo-shi, Aichi-ken, 446; Yoshiaki Hirota, 1-3-1, Nakajima Nakamachi, Okazaki-shi, Aichi-ken, 444-02; Yasuo Hojo, 2-11-1, Katasaka-cho, Mizuho-ku, Nagoya-shi, Aichi-ken, 467; Nobuaki Takahashi, 128, Harayama, Josui-cho, Toyota-shi, Aichi-ken, 470-03; Kagenori Fukumura, 3-1-44, Ogawa-cho, Toyota-shi, Aichi-ken, 471; Yasunari Nakamura, 3-11-8, Uchiyama, Chikusa-ku, Nagoya-shi, Aichi-ken, 464, all of Japan

[21] Appl. No.: 833,386

[22] Filed: Apr. 4, 1997

[30] Foreign Application Priority Data

Apr. 8, 1996 [JP] Japan .................................. 8-110543

[51] Int. Cl.⁶ .................................................. F16H 61/00

[52] U.S. Cl. ............................................................. 475/117
[58] Field of Search ............................................. 475/117

[56] References Cited

U.S. PATENT DOCUMENTS

| 3,359,831 | 12/1967 | Scheiter | 475/117 |
|---|---|---|---|
| 3,465,614 | 9/1969 | Reynolds | 475/117 |
| 4,199,048 | 4/1980 | Ishikawa . | |
| 4,783,000 | 11/1988 | Ty . | |
| 5,421,791 | 6/1995 | Futawatari | 475/117 |

FOREIGN PATENT DOCUMENTS

| 0139359 | 5/1985 | European Pat. Off. . |
| 0263252 | 4/1988 | European Pat. Off. . |
| 59-126118 | 7/1984 | Japan . |
| 7332481 | 12/1995 | Japan . |

OTHER PUBLICATIONS

Japanese Patent Abstract 07332481, Dec. 22, 1995.
Great Britain, Office Action Jul. 2, 1997.
Japanese Patent Abstract 59–126118, Jul. 20, 1984.

*Primary Examiner*—Dirk Wright

[57] ABSTRACT

An oil temperature responsive hydraulic control system for an automatic transmission includes a hydraulic servo for applying/releasing a frictional engagement element; a pressure regulator valve for regulating oil pressure fed to the hydraulic servo; and a signal pressure oil passage for applying a pressure regulating signal pressure to the pressure regulator valve. A control valve is arranged in the signal pressure oil passage for changing the effective diameter of the signal pressure oil passage responsive to change in oil temperature.

4 Claims, 6 Drawing Sheets

|   | C-0 | C-1 | C-2 | B-0 | B-1 | B-2 | B-3 | B-4 | F-0 | F-1 | F-2 |
|---|---|---|---|---|---|---|---|---|---|---|---|
| N |   |   |   | ◌ |   |   |   |   |   |   |   |
| Rev |   |   | ○ | ○ |   |   |   | ○ |   |   |   |
| 1st | ○ | ○ |   |   |   |   |   | ● | ○ |   | ○ |
| 2nd | ● | ○ |   |   |   |   | ○ |   | ○ |   |   |
| 3rd | ○ | ○ |   |   | ● | ○ |   |   | ○ | ○ |   |
| 4th | ○ | ○ | ○ |   |   | ◉ |   |   | ○ |   |   |
| 5th |   | ○ | ○ | ○ |   | ◉ |   |   |   |   |   |

OIL TEMPERATURE RESPONSIVE HYDRAULIC CONTROL SYSTEM FOR AN AUTOMATIC TRANSMISSION

BACKGROUND OF THE INVENTION

1. Field of the Invention

The present invention relates to a temperature-responsive hydraulic control system for an automatic transmission and, more particularly, to a control system for hydraulic servos to apply/release frictional engagement elements in the transmission mechanism of an automatic transmission.

2. Related Art

In an automatic transmission, the feed of oil pressure to the hydraulic servos for applying/releasing the frictional engagement elements is controlled by the hydraulic control system. Specifically, the oil pressure, i.e., the line pressure, as fed through a manual valve, is raised by the pressure regulator valve and fed to the hydraulic servo in accordance with predetermined application characteristics, i.e. raised from the initial state of zero oil pressure to the application pressure, ultimately to the line pressure. For the control of this application pressure, an accumulator is usually used together with the pressure regulator valve. However, the accumulator must have a large capacity and, accordingly, occupies a large space in the hydraulic control system. For this reason, our Japanese Application Laid-Open No. 142203/1994, discloses controlling the application pressure exclusively by the pressure regulator valve. In this system, a signal pressure from an electronically controlled solenoid valve is applied to the pressure regulator valve for controlling the feed of the oil pressure to the hydraulic servos which actuate the frictional engagement elements. In this manner the application pressure is directly controlled by the pressure regulator valve.

In our previous system, described above, if the signal pressure is applied directly to the spool (valve member) of the pressure regulator valve abutting the plunger, the spool exhibits "vibration," in which it repeatedly overshoots and falls short of the desired pressure regulating position, so that the pressure, as regulated by the pressure regulating valve, pulsates. In order to suppress this pulsation, an orifice, having an opening sized to suppress the pulsation of the oil pressure, is usually arranged in the oil passage which feeds the signal pressure to the pressure regulating valve. A similar construction is disclosed in the aforementioned Japanese published application.

The orifice (throttle) arrangement described above is effective for the case in which the flow resistance (viscosity) of the oil is substantially constant. As a matter of fact, however, the viscosity of the oil changes with temperature so that the velocity of the oil flowing through the orifice drops with lower oil temperatures as the viscosity increases. If the oil passage is throttled by an orifice of predetermined size, as in the aforementioned construction, the response of the spool to a change in the signal pressure is excessively delayed at lower oil temperatures, thus causing a response delay in the oil pressure to be regulated. In a serious case, shift shock may result from the delay in the timing of application of the frictional engagement element. The prior art has failed to give special consideration to the change in the pressure regulating characteristics of the pressure regulator valve deriving from a change in temperature.

SUMMARY OF THE INVENTION

It is, therefore, a first object of the present invention to provide a hydraulic control system for an automatic transmission, which suppresses the pulsation of the oil pressure and improves the responsiveness of the oil pressure, independent of the oil temperature.

A second object of the present invention is to provide a smooth change-over of the control for suppressing the pulsation of the oil pressure between control with normal/high oil temperature and control with a low oil temperature.

In a so-called "grip change" shift, wherein the application of one frictional engagement element and the release of another frictional engagement element are simultaneously executed in a shift between predetermined gear stages, the release pressure of the hydraulic servo operating the release side frictional engagement element must be regulated with high accuracy to avoid a drop of the output shaft torque due to the tie-up of the two frictional engagement elements and to avoid engine racing due to under-lap. However, the response delay in the oil pressure regulated by the aforementioned signal pressure, at a low oil temperature, appears mainly as a delay of the start of drop in the release pressure of the hydraulic servo of the release side frictional engagement element. In such a shift, a low oil temperature is liable to cause the two frictional engagement elements to "tie up."

It is, therefore, a third object of the present invention to control the release pressure of the release side hydraulic servo without any response delay due to oil temperature, in a "grip change" (or "clutch to clutch") shift.

In order to achieve the first object, the present invention provides a hydraulic control system for an automatic transmission, which system includes: a hydraulic servo for applying/releasing a frictional engagement element; a pressure regulator valve for regulating an oil pressure fed to the hydraulic servo; and a signal pressure oil passage for applying a pressure regulating signal pressure to the pressure regulator valve, wherein a control valve is provided for throttling the signal pressure oil passage in accordance with oil temperature. In this case, the throttling of the signal pressure oil passage may be either continuous according to the oil temperature or stepwise by switching between different oil passage openings.

In order to achieve the second object, the control valve has a bimetallic actuated variable orifice for increasing the signal pressure oil passage opening in accordance with a drop in the oil temperature, within a predetermined oil temperature region.

In order to achieve the third object, in an automatic transmission including first and second frictional engagement elements for achieving a shift to a predetermined gear stage by releasing the first frictional engagement element and applying the second frictional engagement element, the hydraulic control system includes: a first hydraulic servo for applying/releasing the first frictional engagement element, a second hydraulic servo for applying/releasing the second frictional engagement element; and change-over means for applying the application pressure, as fed to the second hydraulic servo, to the pressure regulator valve.

According to the present invention the opening of the signal pressure oil passage is changed by the control valve according to the oil temperature so that the responsiveness can be improved while preventing the pulsation of the oil pressure fed to the hydraulic servo by the pressure regulator valve. As a result, the oil pressure control characteristics are continuously maintained in the desired state, independently of the oil temperature, so that the hydraulic servo of the frictional engagement element can be properly controlled directly by the pressure regulator valve.

In one preferred embodiment, the signal pressure oil passage opening is increased in a predetermined ratio according to the drop in the oil temperature by the action of the bimetallic element, responsive to temperature change within a predetermined oil temperature range, so that the change in size of the oil passage opening between that for a normal/high temperature and that for a low oil temperature, with increased oil viscosity, is smoothly effected.

In an embodiment of the present invention adapted to the so-called "grip change," in which a shift to a predetermined gear stage is effected by releasing the first frictional engagement element while simultaneously applying the second frictional engagement element, the release pressure of the release side hydraulic servo is controlled, without any response delay due to temperature, in association with the application pressure of the apply side hydraulic servo, so that delay in start of the drop in the release pressure of the hydraulic servo of the release side frictional engagement element is prevented and "tie up" of the two frictional engagement elements is avoided.

DESCRIPTION OF THE PREFERRED EMBODIMENT

Figure 3:
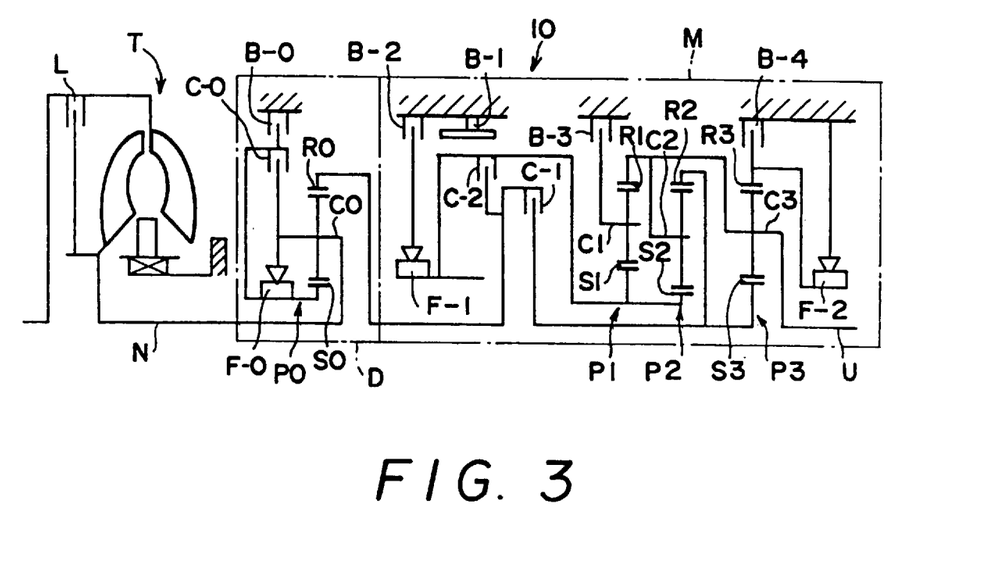
FIG. 3 is a skeletal diagram of a transmission mechanical portion which may be controlled by the system of FIG. 1.

A preferred embodiment of the present invention will now be described with reference to the accompanying drawings. As shown in FIG. 3, the mechanical portion of an automatic transmission 10 is constructed to provide five speeds by combining an auxiliary transmission mechanism D having a front end overdrive and a main transmission mechanism M having a simple three-planetary gear train for providing four forward and one reverse speeds. The mechanical portion is connected to a torque converter T having a lockup clutch L.

The auxiliary transmission mechanism D includes a sun gear S0, a carrier C0, a ring gear R0, a one-way clutch F-0, a multiple disc clutch C-0 in parallel with the one-way clutch F-0, and a multiple disc brake B-0 in series with the multiple disc clutch C-0. On the other hand, the main transmission mechanism M includes three sets of simply connected planetary gear units P1 to P3, in which individual speed change elements, i.e. sun gears S1 to S3, carriers C1 to C3 and ring gears R1 to R3 are directly connected in a suitable manner. In association with the speed change elements of the individual gear units, there are arranged multiple disc clutches C-1 and C-2, a band brake B-1, multiple disc brakes B-2 to B-4, and one-way clutches F-1 and F-2. Each of the individual clutches and brakes is operated by a dedicated hydraulic servo having a piston-cylinder mechanism for applying/releasing.

Figure 5:
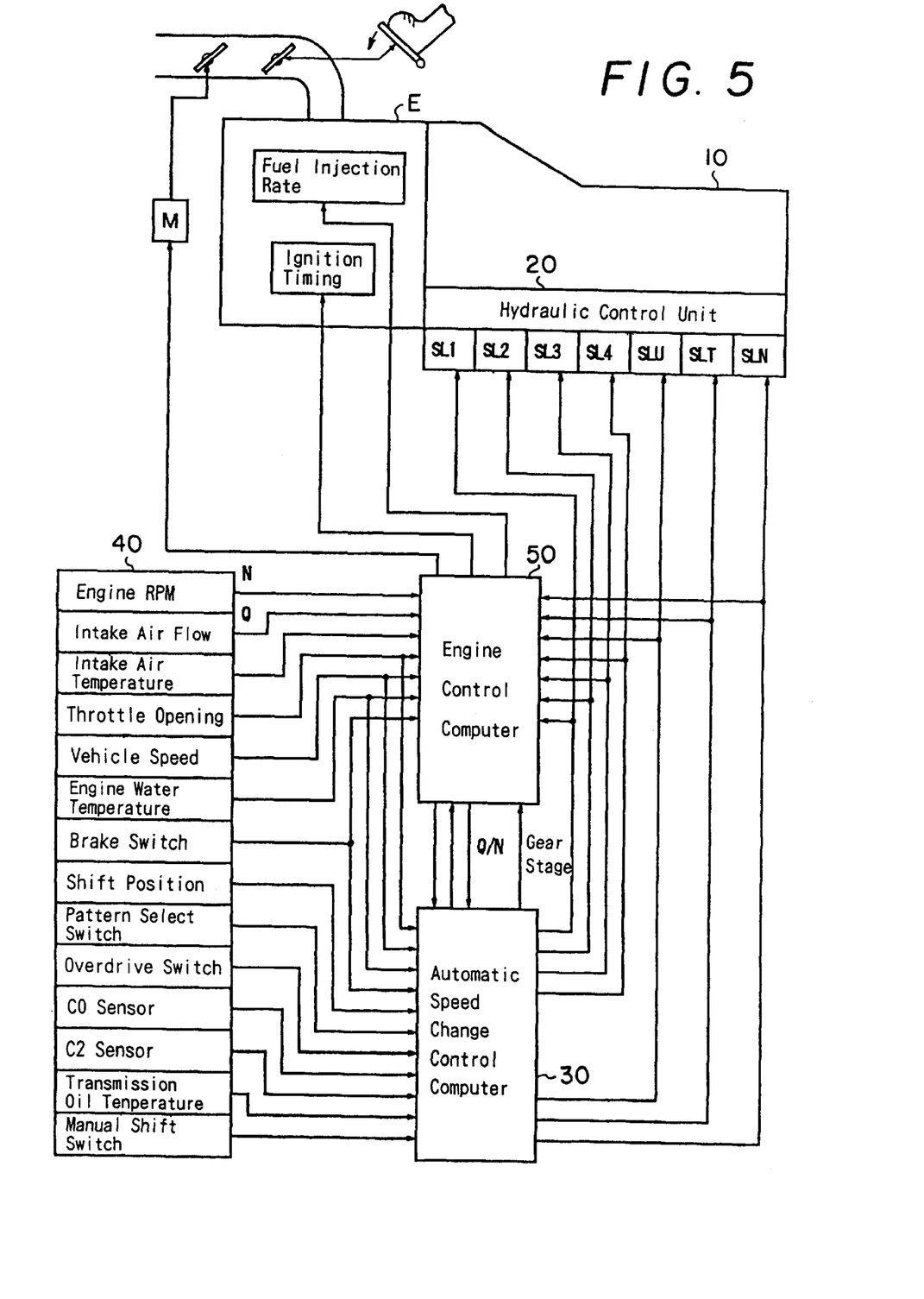
FIG. 5 is a block diagram of the control system which is partially shown in detail in FIG. 1.

As shown in FIG. 5, the automatic transmission 10 includes a hydraulic control unit 20 for controlling the mechanical portion of the transmission, the torque converter and the lockup clutch. The automatic transmission 10 is connected, when mounted on a vehicle, to an engine E, and the hydraulic control unit 20 is connected to an automatic speed change control computer 30 through individual solenoid valves SL1 to SL4 and individual linear solenoid valves SLN, SLT and SLU, built therein. The automatic speed change control computer 30 is connected to a variety of sensors 40, associated with various components of the vehicle, including the engine E, the automatic transmission 10 and an engine control computer 50.

Automatic transmission 10 transmits the rotation of the engine E to the input shaft N of the auxiliary transmission mechanism D through the torque converter T, as shown in FIG. 3. Moreover, the rotation of the input shaft N is transmitted under the control of the aforementioned hydraulic control unit to the sun gear S3 of the gear unit P3, by applying the clutch C-0 to bring the auxiliary transmission mechanism D into a directly connected state and by applying the clutch C-1 of the main transmission mechanism M while releasing all the remaining frictional engagement elements, with output as the 1st speed from the carrier C3 to an output shaft U, while the ring gear R3 is prevented from reverse rotation by the one-way clutch F-2.

2nd speed is established at the output shaft U when the auxiliary transmission mechanism D is directly connected with the clutch C-1 and the brake B-3 is applied. At this time, the input, as transmitted to the ring gear R2 of the gear unit P2, is output to the carrier C2 of the gear unit P2, using the carrier C1 of the gear unit P1 as a reaction element, and to the ring gear R1 of the gear unit P1, directly connected to the carrier C2.

3rd speed is established when the auxiliary transmission mechanism D is directly connected with the clutch C-1 and the brake B-2 is applied with the brake B-3 released. In this gear train, therefore, the aforementioned grip-change shift is effected as the 2nd→3rd shift. At this time, the input to the ring gear R2 of the gear unit P2, is output to the carrier C2, while using the sun gear S2 as a reaction element, so that it becomes the 3rd speed rotation of the output shaft U.

4th speed is established when the auxiliary transmission mechanism D is directly connected with both the clutch C-1 and the clutch C-2 applied. At this time, the input is to the ring gear R2 and to the sun gear S2 so that the gear unit P2 is directly connected to output the input rotation as is.

5th speed rotation is established, with the main transmission mechanism M in 4th speed, by releasing the clutch C-0 and applying the brake B-0 to fix the sun gear S0 and to thereby accelerate the auxiliary transmission mechanism D.

Reverse is established when the auxiliary transmission mechanism D is brought into the aforementioned state with the clutch C-2 and the brake B-4 of the main transmission mechanism M applied. At this time, the input introduced to the sun gear S2 of the gear unit P2, is output as reverse rotation of the carriers C2 and C3 of the gear units P2 and P3, using the ring gear R3 as a reaction element.

Figure 4:
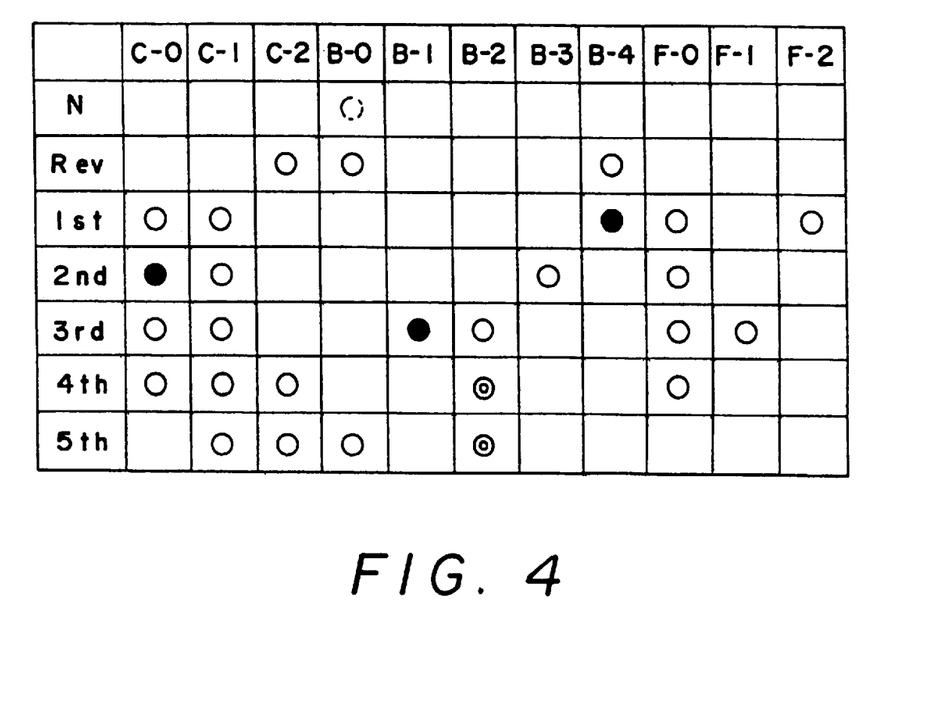
FIG. 4 is a table of operative states of the various frictional engagement elements of the automatic transmission of FIG. 3.

The application/release states of the individual frictional engagement elements and one-way clutches, at the aforementioned individual gear stages, are tabulated in the operation table of FIG. 4. In FIG. 4: symbols ○ indicate the application of a clutch or brake or a locked state for a one-way clutch; symbols ● indicate application only in engine braking; broken symbol ○ indicates optimal application or release; and symbols ⊙ indicate applications not participating in the power transmission.

Figure 1:
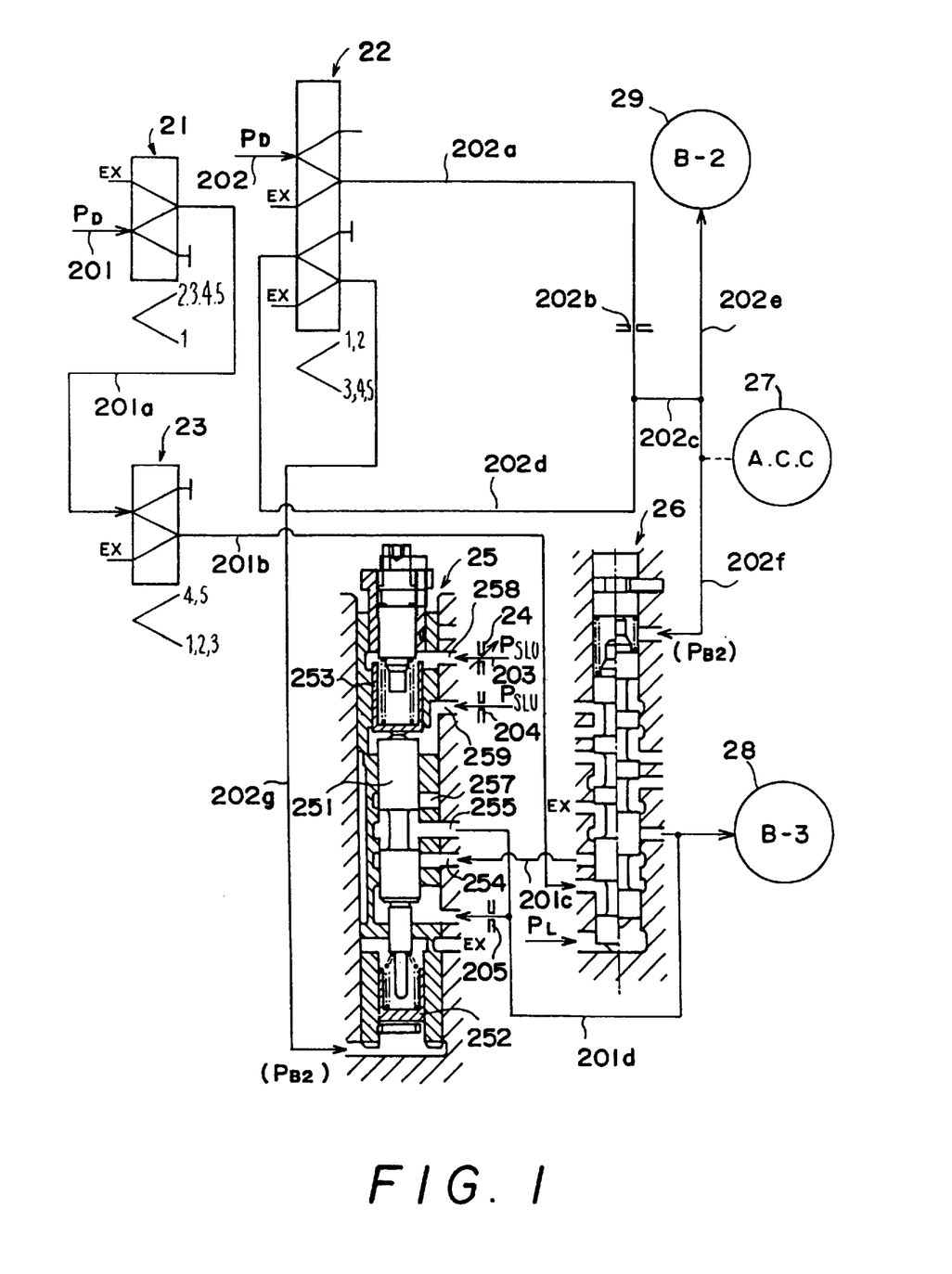
FIG. 1 is a partial circuit diagram of a hydraulic control system for an automatic transmission according to one embodiment of the present invention.

In describing the automatic transmission 10, for purposes of explaining the present invention, the first frictional engagement element is exemplified by the brake B-3 and the second frictional engagement element is exemplified by the brake B-2. The portion of the hydraulic circuit which directly participates in the regulation of feed/discharge of the oil pressure of hydraulic servos 28 and 29 for applying/releasing the brake B-3 and the brake B-2, as shown in FIG. 1, includes a 1–2 shift valve 21, a 2–3 shift valve 22 constituting change-over means, a 3–4 shift valve 23, a B-3 control valve 25 constituting a regulator valve, a solenoid relay valve 26, a B-2 accumulator 27 and a B-2 release valve (not shown in FIG. 1) These circuit components are controlled by the solenoid valves SL1 to SL4, as shown in FIG. 5, for switching the individual shift valves, the linear solenoid valve SLU constituting signal pressure generating means for the lockup clutch, for the linear solenoid valve SLN for controlling the B-2 accumulator 27 and its back pressure, and for the linear solenoid valve SLT for outputting a control signal according to the engine load (or throttle opening in the present embodiment).

In the present embodiment, specifically, the 2nd speed is established by applying the brake B-3, and the 3rd speed is established by releasing the brake B-3 and applying the brake B-2, as has been described. For controlling these shifts the control system of this embodiment includes: the first hydraulic servo 28 for actuating the brake B-3; the second hydraulic servo 29 for actuating the brake B-2; the B-3 control valve 25 for regulating the pressure fed to the first hydraulic servo 28; the 2–3 shift valve 22 for applying the application pressure, as fed to the second hydraulic servo 29, as a pressure regulating signal pressure to the B-3 control valve 25; a signal pressure oil passage 203 fed with the signal pressure from the aforementioned linear solenoid valve SLU; and a control valve 24 disposed in the signal pressure oil passage 203.

The B-3 control valve 25, acting as a pressure regulator valve, has a spool 251 with a land for opening/closing an inlet port 254 which receives a D-range pressure ($P_D$) through the 1–2 shift valve 21, the 3–4 shift valve 23 and the solenoid relay valve 26 and a land for opening/closing a drain port 257. A plunger 253 is spring-loaded to abut against the spool 251 and has a spring-loaded side which serves as a face for receiving a signal pressure ($P_{SLU}$) coming through the control valve 24 and an abutting side, abutting against the spool 251, which serves as a pressure receiving face for receiving the signal pressure ($P_{SLU}$) coming through the 3–4 shift valve 23 and a fixed orifice 204. Plunger 252 is urged by a spring into abutment against the spool 251 and has an end face opposite the spring which receives the application pressure ($P_{B2}$) of the B-2 hydraulic servo 29.

Figure 2:
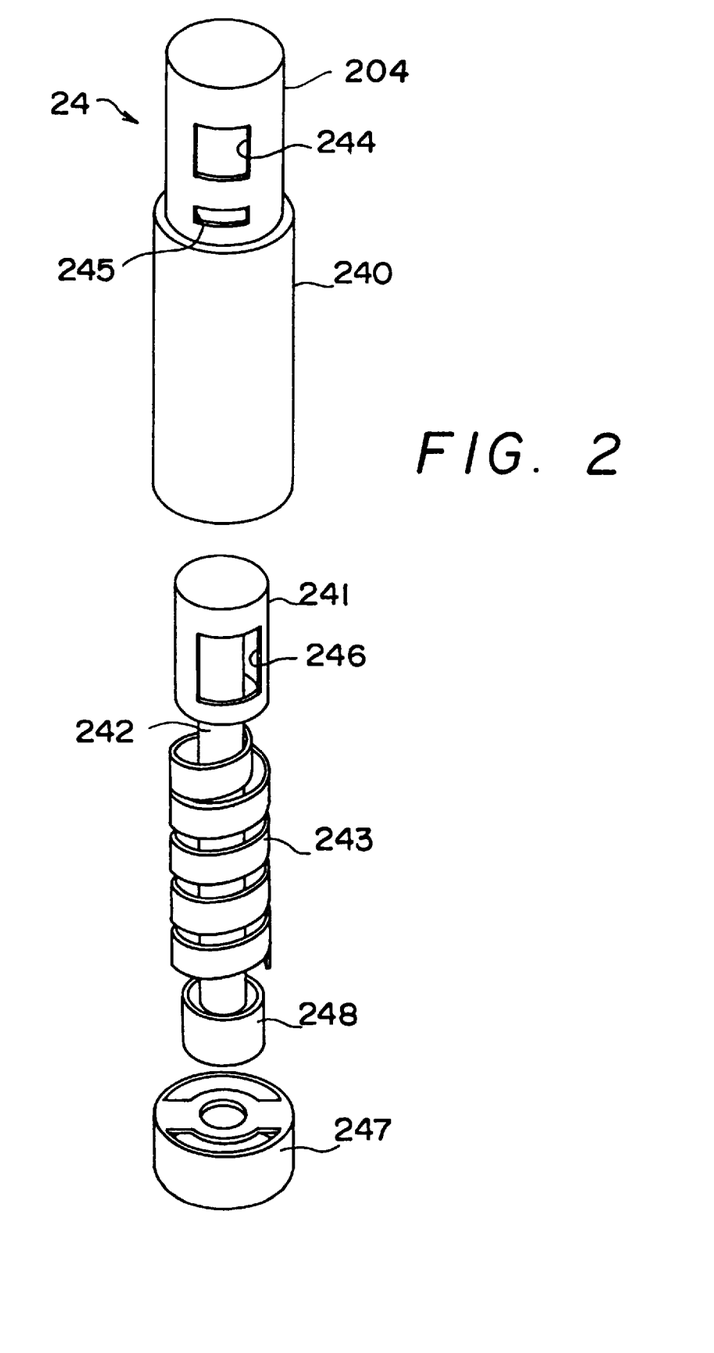
FIG. 2 is an exploded perspective view showing the details of a control valve of the hydraulic control system of FIG. 1.

As shown in detail in FIG. 2, the control valve 24 in this embodiment is composed of: a closed bottom outer cylinder 204; a closed bottom inner cylinder 241; a spindle 242 fixed at its one end to the bottom interior of the inner cylinder 241 and rotatably supported at its other end, within the outer cylinder 240, through a spindle support member 247; and a bimetallic coil 243 of a cylindrical coil shape fixed at its one end to the spindle 242 and fixed at its other end to the outer cylinder 240 through a joint member 248. In the cylindrical wall adjoining the bottom of the outer cylinder 240, are formed a square opening 244 and a slit-shaped fixed orifice opening 245 which is located in a portion which does not overlap the inner cylinder 241 when assembled. In the cylindrical wall, also adjoining the bottom of the inner cylinder 241, there is formed an opening 246 which is larger than the square opening 244 of the outer cylinder 240. Thus, the overlapping openings 244 and 246 function as a variable orifice by telescoping relative movement. More specifically, for example, the fixed orifice opening 245 is made equivalent to an orifice having a diameter of $\phi$, and the variable orifice opening 244 is made equivalent to an orifice having a diameter of 2.8 $\phi$ so that they coact as a variable orifice having a minimum diameter of $\phi$ and a maximum diameter of 3 $\phi$.

The control valve 24 thus constructed is fitted into a signal pressure oil passage which is formed in the valve body (not shown) of the hydraulic control unit. Specifically, the outer cylinder 240, as assembled with the inner cylinder 241, the spindle 242, the bimetal coil 243, the spindle support member 247 and the joint member 248, is inserted into the face of the valve body, for example, into the signal pressure oil passage hole, and is set to allow the two orifice openings 244 and 245 to communicate with the oil passage hole extending to a port 258 of the B-3 control valve 25 (as shown in FIG. 1).

Reverting to FIG. 1, here will be described in detail the connections between the aforementioned individual valves and oil passages. A D-range pressure oil passage 201, leading to the manual valve (not shown), is connected through the 1–2 shift valve 21, an oil passage 201a, the 3–4 shift valve 23, an oil passage 201b, the solenoid relay valve 26 and an oil passage 201c to the B-3 control valve 25 and further through this valve 25 and an oil passage 201d to the B-3 hydraulic servo 28.

Another D-range oil passage 202, leading from the manual valve, passes through the 2–3 shift valve 22, into an oil passage 202a with an orifice 202b and then branches into a feed oil passage 202c and a signal pressure oil passage 202d. The feed oil passage 202c is further branched into a feed oil passage 202e, which is connected to the brake B-2 hydraulic servo 29, and a signal oil passage 202f which is connected to the solenoid valve 26 and the accumulator 27. The signal pressure oil passage 202d, which branches off downstream of the orifice 202b, is connected through the 2–3 shift valve 22 and an oil passage 202g to the B-3 control valve 25.

The solenoid relay valve 26 is a spring-loaded spool type change-over valve, which receives, at its spring-loaded end, the brake B-2 application pressure of the signal oil passage 202f as a signal pressure and, at its other end, a line pressure ($P_L$). In this manner relay valve 26 regulates the communication between the oil passage 201b and the oil passage 201c and between the oil passage 201d and the drain.

In a 1st→2nd shift, the solenoid relay valve 26 is moved to the position illustrated in the righthand half of FIG. 1 by the line pressure ($P_L$), as applied to the end opposite the spring-loaded end, because the oil passage 202a of the brake B-2 hydraulic servo 29 is drained by the 2–3 shift valve 22 to release the signal pressure from the spring-loaded end of relay valve 26. As a result, the D-range pressure ($P_D$), fed through the 1–2 shift valve 21 and the 3–4 shift valve 23, is further fed through the solenoid relay valve 26 to the port 254 of the B-3 control valve 25. Thus, the B-3 control valve 25 is brought into a pressure-regulating state by the signal pressure ($P_{SLU}$) applied to its plunger 253 and the opposed feedback pressure from the oil passage 201d through the orifice 205. In this manner the feed of the application pressure, based on the D-range pressure ($P_D$) coming from the port 255 through the 3–4 shift valve 23 and the solenoid relay valve 26, is started to the hydraulic servo 28.

Figure 8A:
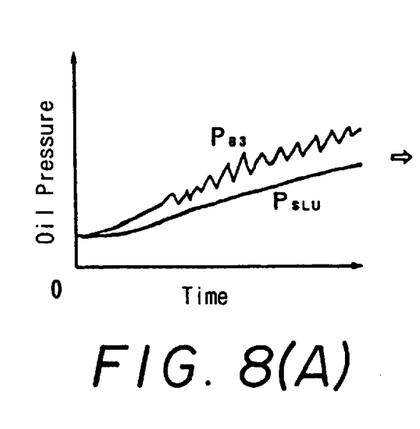
FIGS. 8(A) and 8(B) are graphs, in the form of oil pressure characteristic diagrams, illustrating the effect of the orifice in a shift at normal/high oil temperature in the hydraulic control system of the present invention.
Figure 8B:
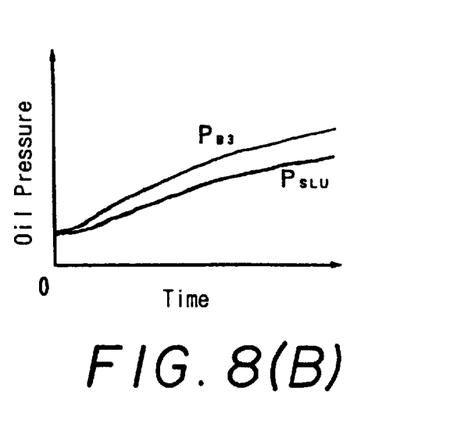

FIG. 8 illustrates the relationship between the solenoid valve signal pressure ($P_{SLU}$) at the beginning of the 1st→2nd shift and the application pressure ($P_{B3}$) fed to the hydraulic servo 28. The linear solenoid valve signal pressure ($P_{SLU}$) from the signal pressure oil passage 203 is controlled so that it is raised in accordance with predetermined characteristics. If, at this time, the oil temperature is normal (high) the inner cylinder 241 is turned in the control valve 24 to fully close the opening 244 while leaving only the fixed orifice 245 open, because the spindle 242 is turned by the torsional expansion of the bimetallic coil 243. As a result, the brake B-3 application pressure ($P_{B3}$) is damped to rise without fluctuation, as illustrated in FIG. 8(B). Thus, fluctuation of the brake B-3 application pressure ($P_{B3}$), as illustrated in FIG. 8(A), which might otherwise result from too large an orifice opening at a normal (high) oil temperature, is avoided. When the application of the brake B-3 has advanced to the point where the linear solenoid valve signal ($P_{SLU}$) has become a constant value, the brake B-3 application pressure ($P_{B3}$) is raised to the line pressure, without serious delay, to end the shift.

Figure 7A:
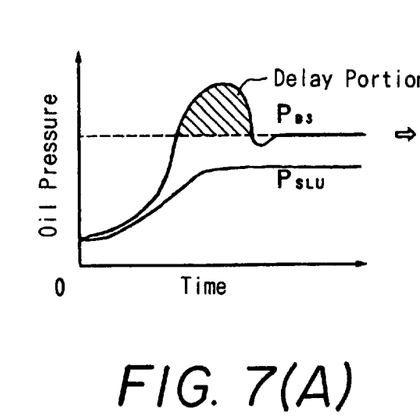
FIGS. 7(A) and 7(B) are graphs, i.e. oil pressure characteristic diagrams, illustrating the effect of the orifice in a shift at a low oil temperature in the hydraulic control system of FIGS. 1 and 5.
Figure 7B:
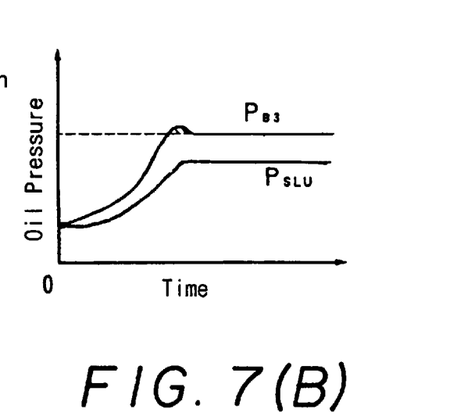

When the oil temperature is low, on the other hand, the variable orifice 244 of the control valve 27 is opened by the torsional contraction of the bimetallic coil 243, with overlap between the two openings 244 and 246, by the turning of the inner cylinder 241, thereby enlarging the area of the opening. Due to the effect of the increased viscosity of the oil, however, the brake B-3 application pressure ($P_{B3}$) is also damped at the lower temperature to avoid fluctuation as the application pressure is raised as illustrated in FIG. 8 (B). As the application of the brake B-3 likewise advances to where the linear solenoid valve signal pressure ($P_{SLU}$) becomes a constant valve, the brake B-3 application pressure ($P_{B3}$) also reaches maximum without serious delay to complete the shift. In this case, therefore, it is also possible to prevent a serious control delay, as illustrated by the hatched area in FIG. 7(A), in obtaining the brake B-3 application pressure ($P_{B3}$).

Figure 9:
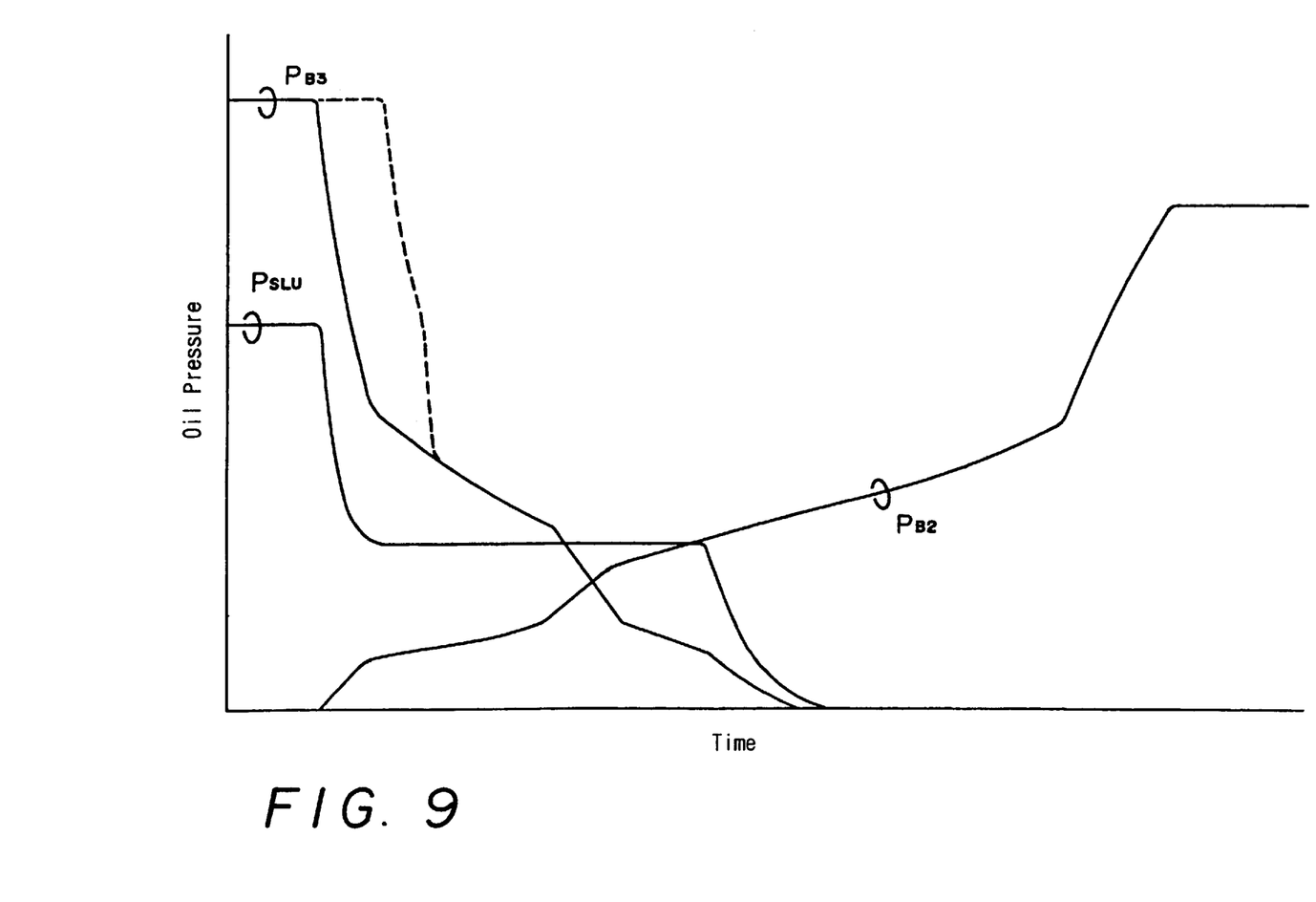
FIG. 9 is a graph in the form of an oil pressure diagram for 2nd→3rd shift control in the automatic transmission of FIG. 3.

In a 2nd→3rd shift the 2–3 shift valve 22, as shown in FIG. 1, is switched to the 3rd speed side, and the control current of the linear solenoid valve SLU is reduced so that the D-range pressure ($P_D$) begins to be fed through the 2–3 shift valve 22 to the feed oil passage 202e, whereas the signal pressure ($P_{SLU}$) in the signal pressure oil passage 203 is lowered. At this time, the brake B-3 release pressure ($P_{B3}$), as shown in FIG. 9, is regulated by the B-3 control valve 25 according to the rise in the brake B-2 application pressure ($P_{B2}$), which is at least the minimum necessary for maintaining the torque transmission at the 2nd speed. When the fast fill for the piston stroke to the hydraulic servo 29 of the brake B-2 ends and is followed by an inertial phase for the start of torque transmission, the transition of the torque transmission from the 2nd to 3rd speeds is effected by controlling the back pressure of the B-2 accumulator 27. When the inertial phase ends, the shift end is decided upon synchronization at 3rd speed. At the end of the pressure accumulation of the B-2 accumulator 27, the oil pressure in the signal oil passage 202f rises to switch the solenoid relay valve 26 so that the brake B-3 oil passage 201d is drained by the solenoid relay valve 26 to end the shift.

If the orifice opening area is not enlarged at the time the signal pressure ($P_{SLU}$) in the signal pressure oil passage 203 changes to a low level, as described above, the brake B-3 releasing pressure ($P_{B3}$) is delayed to drop, as illustrated by a dotted curve in FIG. 9, by the response delay of the B-3 control valve 25. As a result, the pressure drop would be delayed to an instant immediately before the start of the torque transmission through the brake B-2 so that the desired control characteristics cannot be achieved. In the present invention, therefore, in the case of a low oil temperature, the variable orifice opening area of the control valve 24 is enlarged to effect the pressure drop at the intended timing, as illustrated by a solid curve in FIG. 9. Especially in this embodiment, therefore, the opening area of the variable orifice opening 244 is changed relative to the fixed orifice opening 245. This is because even if the variable orifice opening 244 should be closed (zero), e.g. due to a malfunction in movement of the inner cylinder 241, the minimum orifice opening area is retained by the fixed orifice opening 245 to prevent a state in which the signal pressure ($P_{SLU}$) cannot be applied or in which the B-3 control valve 25 is brought into the locked state by blocking of the signal pressure ($P_{SLU}$).

A variety of techniques can be imagined for changing the orifice aperture area responsive to oil temperature. From the viewpoint of possible failure to retain the minimum orifice opening area through the fixed orifice, in the present embodiment, an equivalent orifice diameter is determined for the square orifice, taking into account the different fluid flow characteristics as compared to the ordinary circular orifice, set to a size which is equivalent to a circular orifice having a diameter $\phi_s$=1 mm. In other words, the fixed orifice opening 245 is effectively the equal of a conventional orifice having a diameter of $\phi$=1 mm. With the minimum orifice opening area thus set as a constant, a predetermined oil temperature is set as a reference point for changing the area of the variable orifice opening.

Figure 6:
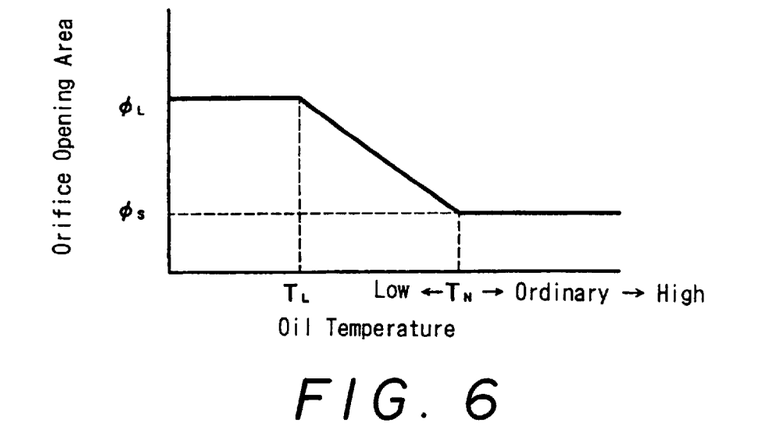
FIG. 6 is a graph in the form of an orifice switching characteristic diagram for the control valve of the hydraulic control system of FIGS. 1 and 5.

This predetermined oil temperature can also be ascertained in various ways. In the present embodiment, however, the area of the opening is controlled by the continuous rotational displacement, responsive to temperature change, provided by the coiled bimetallic element which actuates the control valve. Therefore, the control assumes a predetermined oil temperature within a range of constant width. It is, however, apparent that if this width is set to 0, the orifice opening area can be stepwise changed between the minimum and the maximum. A relationship between a predetermined oil temperature region and the orifice opening area is illustrated in FIG. 6. In this embodiment, the predetermined oil temperature region has its is lower limit set at $T_L$=−15° C., a temperature at which the responsiveness of the pressure regulator valve is extremely poor for the aforementioned minimum orifice opening area (i.e., the equivalent orifice diameter $\phi_s$), and has its upper limit set at a temperature of $T_N$=20° C., at which temperature the output of the pressure regulator valve begins to pulsate for the maximum orifice opening area (i.e., the equivalent orifice diameter $\phi_L$). Thus, the orifice opening area may change continuously from the minimum to the maximum. In this embodiment the low temperature is set to be no more than 20° C., the normal temperature is set to be around 80° C. and the high temperature is set to be around 120° C. However, these temperature definitions are not necessarily absolute. Thus, the control characteristics provided by orifice change in the predetermined oil temperature region (less than $T_N$=20° C. and more than $T_L$=−15° C.) are maintained within a desirable range.

In the embodiment thus far described, suppression of the pulsation of the brake B-3 applying pressure ($P_{B3}$) at the normal/high oil temperature and the improvement in the responsiveness of the brake B-3 applying pressure at a low oil temperature are both achieved by controlling the signal pressure ($P_{SLU}$) applied to the B-3 control valve 25, by the control valve 24 in accordance with the temperature, so that the brake B-3 hydraulic servo 28 can be directly controlled by the B-3 control valve 25 independently of the oil temperature and without using any accumulator. In the low oil temperature region, moreover, the oil passage opening can be controlled at the predetermined ratio by the control valve 24 in accordance with the change in the viscosity of the oil by the actuation of the bimetallic coil 243 responding to change in temperature. As a result, the desired control characteristics of the oil pressure of the B-3 control valve 25 are maintained over a wide continuous range from the normal/high oil temperature to a low oil temperature. In a "grip changing" shift, moreover, the delay in the start of the drop of the brake B-3 (releasing) pressure can also be prevented by controlling the release pressure of the release side hydraulic servo 28, i.e. without the delay in responsiveness which might otherwise be caused by a lower temperature, in relation to the application pressure of the application side hydraulic servo 29, thereby avoiding conditions in which the two frictional engagement elements are liable to tie up.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic control system for an automatic transmission, comprising:

a first hydraulic servo for applying/releasing a first frictional engagement element;

a signal regulator valve for regulating a signal pressure;

a pressure regulator valve for regulating an oil pressure feed to said first hydraulic servo, responsive to said signal pressure;

a signal pressure oil passage for applying said regulated signal pressure to said pressure regulator valve; and a control valve arranged in said signal pressure oil passage for throttling oil flow through said signal pressure oil passage, responsive to change in oil temperature, said control valve comprising orifice means defining an orifice of variable size for said throttling and a bimetallic element for increasing the size of said orifice, responsive to a drop in the oil temperature within a predetermined oil temperature region.

2. A hydraulic control system for an automatic transmission according to claim 1, wherein the automatic transmission includes said first frictional engagement element and a second frictional engagement element and shifts to a predetermined gear stage by releasing said first frictional engagement element and by applying said second frictional engagement element; and wherein said hydraulic control system further comprises a second hydraulic servo for applying/releasing said second frictional engagement element responsive to an operating pressure; and change-over means for applying said operating pressure to said pressure regulator valve.

3. A hydraulic control system for an automatic transmission according to claim 1 wherein said control valve comprises:

a first cylindrical member having a hollow cylindrical interior defined by a first cylindrical wall portion closed at one end and open at a second end opposite one end, said cylindrical wall portion having a first opening; and a second cylindrical member having a hollow cylindrical interior defined by a second cylindrical wall portion closed at one end and open at an opposing second end, said second cylindrical wall portion having a second opening and being fixed to one end of said bimetallic element, said second cylindrical member being mounted within said first cylindrical member for movement relative thereto, driven by said bimetallic element responsive to said change in oil temperature, said first opening and said second opening constituting said orifice of variable size.

4. A hydraulic control system for an automatic transmission according to claim 3 wherein said first cylindrical member has a third opening for passage of oil therethrough to said pressure regulator valve, said third opening remaining fully open throughout said movement of said second cylindrical member relative to said first cylindrical member.

* * * * *

UNITED STATES PATENT AND TRADEMARK OFFICE
CERTIFICATE OF CORRECTION

PATENT NO. : 5,865,702
DATED : Feb. 2, 1999
INVENTOR(S) : YOKOYAMA et al

It is certified that error appears in the above-identified patent and that said Letters Patent is hereby corrected as shown below:

On the Title page, --

*Attorney, Agent or Firm* - Lorusso & Loud--.

should be added.

Signed and Sealed this

Eleventh Day of July, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,865,702
DATED : Feb. 2, 1999
INVENTOR(S) : YOKOYAMA et al

It is certified that error appears in the above-identified patent and that said Letters Patent is hereby corrected as shown below:

ON THE FACE OF THE PATENT:

Insert:

--[73] Assignee: AISIN AW CO., LTD. and TOYOTA JIDOSHA KABUSHIKI KAISHA, both of Japan--

Signed and Sealed this

Twenty-second Day of August, 2000

Attest:

Q. TODD DICKINSON

Attesting Officer          Director of Patents and Trademarks